Nov. 6, 1934.   S. J. PEHRSSON   1,979,406
BAG TRUCK
Filed Oct. 7, 1929
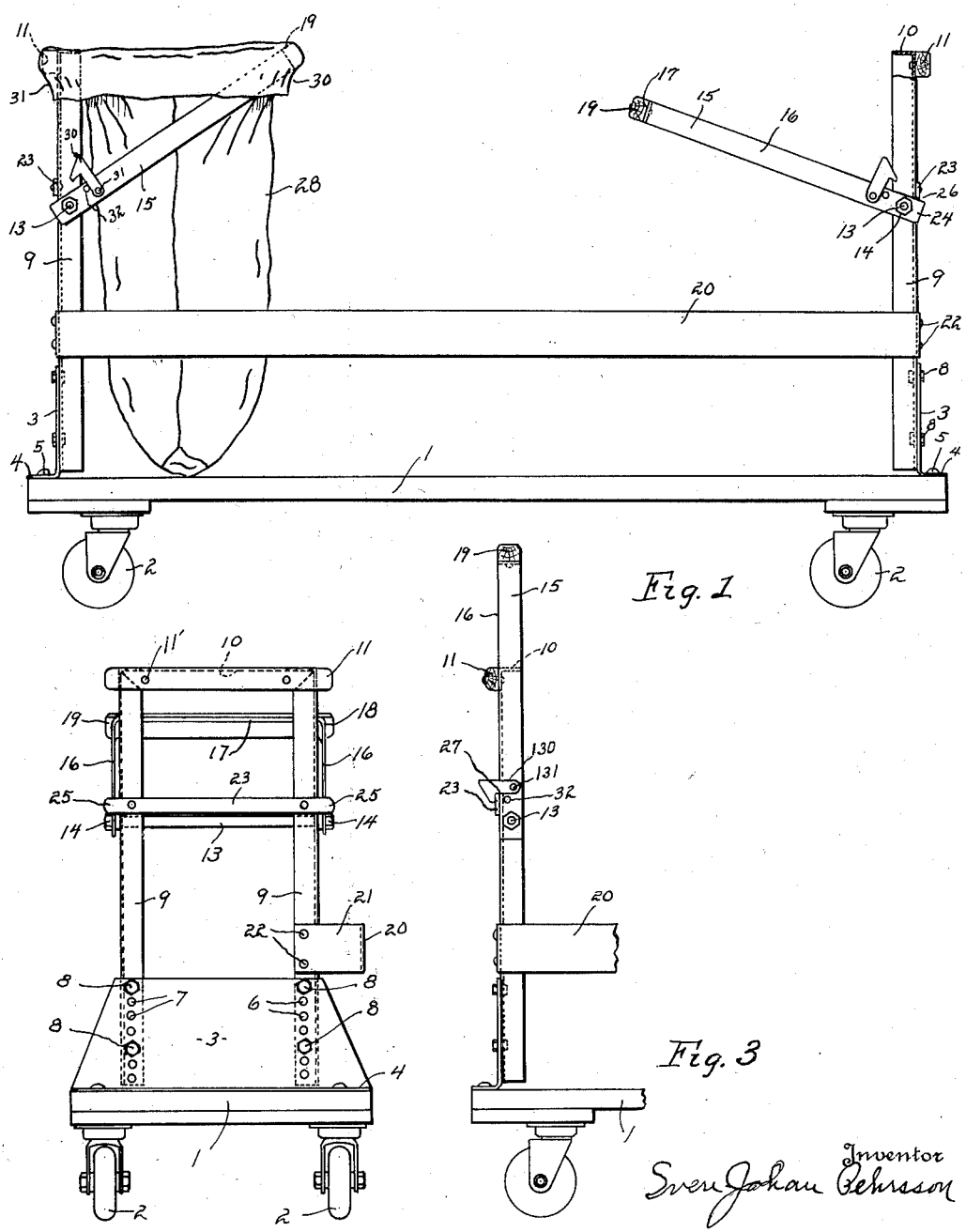

Patented Nov. 6, 1934

1,979,406

UNITED STATES PATENT OFFICE 1,979,406

BAG TRUCK

Sven Johan Pehrsson, Elyria, Ohio, assignor to The Colson Company, Elyria, Ohio, a corporation of Ohio Application October 7, 1929, Serial No. 397,778

4 Claims. (Cl. 83—26)

This invention relates to trucks and particularly to bag trucks.

In various factory processes, it is desirable to load articles into bags from a machine or the like. As illustrative of this, in laundries it is desirable and to some extent customary to empty the contents of the pockets of a wash wheel into bags. Other examples could be cited, but in order that the disclosure herein of my invention may be facilitated, I have chosen to describe my invention only in connection with a laundry bag truck.

One of the objects of my invention is to provide a truck adapted to transport a bag receptacle.

Another object is to provide a truck for mounting a bag and holding it in open receiving position and for transporting it when filled.

Another object is to provide a truck having means for supportably mounting a bag in open position for receiving articles and upon which the bag may be easily and quickly mounted or removed therefrom.

Another object is to provide an efficient and simple supporting means upon which the open end of a bag to be supported may be secured and which will hold the mouth of the bag securely in wide open position to receive articles.

Another object is to provide a bag truck which may be simply and easily adjusted to accommodate it to bags of different lengths and/or to adjust the height of the open end of the bag to the machine, wash wheel or the like from which it is desired to discharge articles into the bag.

Other objects will be apparent to those skilled in this art.

My invention is fully disclosed in the following description taken in connection with the accompanying drawing, in which:—

Fig. 1 is a side elevational view of a truck embodying my invention and showing a bag in open article receiving position;

Fig. 2 is an end view of the truck of Fig. 1;

Fig. 3 is a view similar to Fig. 1 showing only a portion thereof and with the bag of Fig. 1 removed and with parts thereof in different positions.

In the drawing, I have shown at 1 a truck bed or body preferably of a length several times greater than its width and supported on wheels 2—2 which may be of any suitable type, but which in the preferred embodiment of my invention are castering wheels. The bed 1 may be constructed in any suitable or known manner.

At each end of the bed 1 is mounted a vertical gusset plate or bracket 3 extending transversely across the bed, and provided with a horizontal flange 4 upon which it may stand upon the bed 1 and by which through bolts 5 may be bolted to the bed 1.

The bracket 3 has two vertical rows of holes 6, 6 and 7, 7 spaced vertically and bolted to the bracket 3 by bolts 8, 8 and in adjustable position on the bracket 3 by means of the holes 6 and 7 is a pair of risers 9—9 formed preferably from angle iron.

At their tops, the risers 9 are joined by a horizontal angle iron 10. The angle iron 10 is covered on the angle flange facing away from the end of the truck by a cleat 11 of wood, the side edges and end edges and corners of which are preferably rounded off to provide a smooth exterior surface thereon, and the cleat 11 may be secured to the angle iron 10 by bolts, screws or the like 11'.

Below the top of the risers 9, a through bolt or axle 13 is mounted in the side flanges of the angle-form risers, being rotatable therein about a horizontal axis through the bolt and being held against transverse displacement by nuts 14—14 on the ends of the bolt.

Mounted for rotation on the axis of the bolt is a U-shaped arm 15, the side legs of the arm 16 being perforated to receive the bolt 13. The side legs 16 of the U are disposed substantially parallel to the longitudinal direction of the truck and the closed end 17 of the U is disposed substantially transversely of the truck providing corners, as at 18. The straight transverse portion 17 of the arm 15 thus provided is covered by a cleat 19 like or similar to the cleat 11, hereinbefore described.

The risers 9 on one end of the truck may be connected to the risers 9 at the other end of the truck by a longitudinal side bar or brace 20 preferably of sheet metal extending the full length of the truck and bent over at its ends at a right angle to form attaching flanges 21 secured as by rivets or bolts 22 to the corresponding riser 9. In the form of truck illustrated, only one bar 20 is shown on what may be termed the rear side of the truck, but, as will be understood, bars on each side thereof may be employed. The height of the bar 20 may be determined for convenience in loading and unloading the truck.

Connecting each pair of risers 9 and extending substantially horizontally and transversely across each end of the truck is a stop bar 23 riveted or bolted to the end flanges of the angle form risers 9. The bar 23 is so positioned in height as to serve as a stop to stop and limit the downward rotational movement of the arm 15 when the arm is in substantially the position shown on the right hand end of the truck of Fig. 1.

The stopping function is effected by the following arrangement: The side legs 16 of the arm 15 extend outwardly beyond the bolt 13 on which they rotate, as at 24, Fig. 1, and the stop bars 23 extend transversely beyond and over the side legs 16, as at 25, Fig. 2, and when the arms 15 rotate, Fig. 1, the upper edges of the legs 16 engage and are stopped on the lower edge of the stop bar 23, as at 26. The stop bar 23, as will be understood, may be positioned at any desired height to vary the stopped position of the arm 15. Similarly, the stop bar 23 may serve to stop the arm 15 when rotated to an upper position to be described and shown in Fig. 3, in this position the stop bar 23 stopping the rotation of the arm 15 by engagement between the upper edges of the side legs 16 with the flat inner face of the stop bar 23, as at 27, Fig. 3.

The operation of my invention is as follows: The arm 15 is placed in the position shown at the right hand end of Fig. 1 and is stopped in that position by the stop 23. A bag illustrated at 28 in Fig. 1 is then lowered into the rectangular space enclosed by cleats 11 and 19 and the side legs 16 of the arms 15. The open end of the bag is then folded or wrapped over the cleats 11 and 19, as shown at 30 and 31 and to facilitate this operation, the arms 15 may be raised to bring the cleats 11 and 19 closer together. When this operation has been performed, the arm 15 may be depressed by pushing downwardly on the cleat 19 and this will stretch the open end of the bag and cause it to be securely gripped on the cleats. If the tension of the bag thus created does not hold the arm 15 upwardly, the arm cannot sink below a predetermined point determined by the stop 23, as will be understood. The truck may now be wheeled to the machine, wash wheel or the like and the contents thereof emptied into the bag.

It is one of the advantages of my invention, particularly as applied to laundry trucks, that two bags, one on each end of the truck may be so spaced apart as to correspond to the distance between two pockets of a wash wheel so that the pockets may be individually discharged into the bags on the truck without mixing or confusing the contents of the pockets.

When the bags have thus been loaded, the truck and bags may be wheeled away. To remove a bag from the truck, the operation of raising the arm 15 will release the tension on the mouth of the bag and the latter may be removed from the cleats 11 and 19, and by further rotating the arm 15 in the rotative position shown in Fig. 3, the bag and its contents will be entirely disengaged from the holding device and the bag may be freely removed from the truck.

The bag holding element of my invention therefore is seen to effect the advantageous functions of stretching the mouth of the bag open to receive articles, holding the bag upright in article receiving position, and withdrawing entirely out of the path of the bag when it is desired to remove the same.

While I have shown and described my invention as applied to a truck for holding more than one bag, it will be apparent that my invention is equally applicable to a truck for a single bag, in which case, the bag holding device on one end of the truck illustrated would be removed, and if desired the truck body made shorter, but inasmuch as this will be apparent and thoroughly understood by those skilled in this art, a further description thereof is not deemed necessary.

In some cases, in the use of my invention, it may be desirable to temporarily secure the U-shaped arms 15 in their uppermost position, Fig. 3. For this purpose, I may provide the latch device shown in Figs. 1 and 3. On one of the side legs 16 and adjacent the pivot bolt 13 therein, a latch 130 is pivoted as at 131, and a post or rivet head or the like 32 is provided in the leg 16 to normally support the latch 130 in a position substantially at right angles to the arms 16, as shown in Fig. 1. When the arms 15 as a whole are latched to the position shown in Fig. 3, the latch 130 will hook over the stop bar 23 and will prevent the arm from accidentally rotating back into the bag supporting position. When it is desired, however, to support a bag, the latch 130 may be lifted by hand to free the arm 15.

My invention is not limited to the exact details of construction shown and described, inasmuch as my invention may be embodied in trucks in which the foregoing arrangement of parts is variously changed or modified and without departing from the spirit of my invention or sacrificing its advantages.

I claim:

1. In a bag truck, a truck frame, a riser on the frame, a bag spreader on the riser, a U-shaped arm mounted for rotation on the riser about a substantially horizontal axis, a bag spreader on the closed end of the U-shaped arm, spaced from the first spreader, the spreader being adapted to have folded thereover the open end of a bag to be supported, the U-shaped arm being adapted to enclose said bag, the legs of the U having rotational bearing on the riser and the free ends thereof extending beyond the bearing, stop means on the riser engageable by the free ends of the U legs for limiting movement of the movable spreader away from the first spreader and engageable by the legs of the U on the opposite side of the bearing from the free ends for limiting movement of the movable spreader toward the spreader on the support.

2. In a bag truck, a truck frame, a main support on said frame, an auxiliary support hingedly connected to said main support having two non-operative positions, the one in substantially parallel relation to said main support maintained by the engagement of stop means associated with said main support and latch means associated with said auxiliary support, and the other maintained by the engagement of said auxiliary support with said stop means limiting its downward movement, and a plurality of intermediate operative positions effected by the communication of weight of a bag which is placed over the end of both of said supports, whereby the top of the bag is disposed in horizontal relation to the main frame of the bag truck.

3. In a bag truck, a truck frame, a main support on said frame, an auxiliary support hingedly connected to said main support having two non-operative positions, the one in substantially parallel relation to said main support maintained by the engagement of stop means associated with said main support and latch means associated with said auxiliary support, and the other maintained by the engagement of said auxiliary support with said stop means limiting its downward movement, and a plurality of intermediate operative positions effected by the communication of weight of a bag which is placed over the end of both of said supports, whereby the top of the bag is disposed in horizontal relation to the main frame of the bag truck, the weight of the bag and articles therein suspended from said supports.

4. In a bag truck, a truck frame, a main support on said frame, an auxiliary support hingingly connected to the main support and having a first and second non-operative position and a plurality of intermediate operative positions as determined by the weight of a bag engaging the main and auxiliary supports, an abutment on the main support engageable with the inner end of the auxiliary support to limit its downward movement and determining the first non-operative position, the abutment also being engageable with the auxiliary support to limit its upward movement towards the main support and determining the second non-operative position, and positive cooperating latch means on the main and auxiliary supports engageable by movement of the auxiliary support to the second non-operative position for maintaining the auxiliary support in said position, the latch means being ineffective to release the auxiliary support by pressure exerted thereon urging the auxiliary support toward the first non-operative position.

SVEN JOHAN PEHRSSON.